(12) United States Patent
Warren

(10) Patent No.: US 7,293,936 B1
(45) Date of Patent: Nov. 13, 2007

(54) PRECISION ALIGNING FASTENER

(76) Inventor: Craig A. Warren, 369 Falmouth Rd., Falmouth, ME (US) 04105

( * ) Notice: Subject to any disclaimer, the term of this patent is extended or adjusted under 35 U.S.C. 154(b) by 154 days.

(21) Appl. No.: 11/190,477

(22) Filed: Jul. 27, 2005

Related U.S. Application Data

(60) Provisional application No. 60/591,768, filed on Jul. 28, 2004.

(51) Int. Cl.
*F16B 7/00* (2006.01)
(52) U.S. Cl. .................. 403/296; 403/292; 403/348; 124/23.1; 440/101
(58) Field of Classification Search ............ 403/292, 403/296, 348, 349, 350; 411/417, 437, 551; 124/23.1; 440/101
See application file for complete search history.

(56) References Cited

U.S. PATENT DOCUMENTS 1,451,970 A * 4/1923 Taylor ...................... 411/418
2,228,823 A * 1/1941 Helm ......................... 124/23.1
3,771,508 A * 11/1973 Black et al. ............... 124/24.1
5,306,983 A * 4/1994 Lehner ....................... 411/417
5,324,297 A * 6/1994 Hood et al. ................... 606/99
6,022,255 A * 2/2000 Lukanovich ................ 440/101
6,544,087 B1 * 4/2003 Peng .......................... 440/101

* cited by examiner

*Primary Examiner*—Daniel P. Stodola
*Assistant Examiner*—Michael P. Ferguson
(74) *Attorney, Agent, or Firm*—Patricia M. Mathers

(57) ABSTRACT

Precision aligning fastener for releasably joining two halves of a manufactured article. The precision aligning fastener has a male body that threads into a female body. The threads on the male and female threads, bodies are provided in an interrupted-thread pattern, allowing the male body to be completely inserted into the female body before twisting and engaging the threads. A stop means is provided, to assist in aligning and to prevent overtightening of the fastener. The fastener is particularly well-suited to releasably join long, slender articles that must be precisely aligned to function properly, such as a hunter's longbow, billiard cues, furniture, etc.

8 Claims, 2 Drawing Sheets

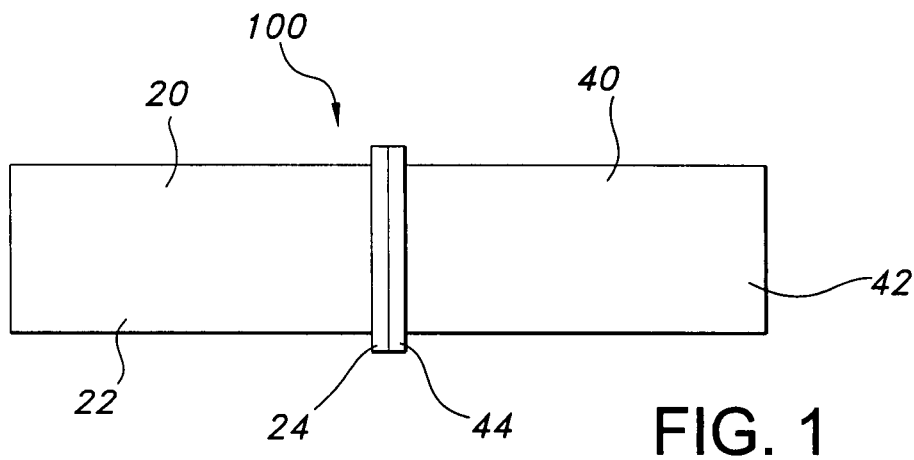
FIG. 1
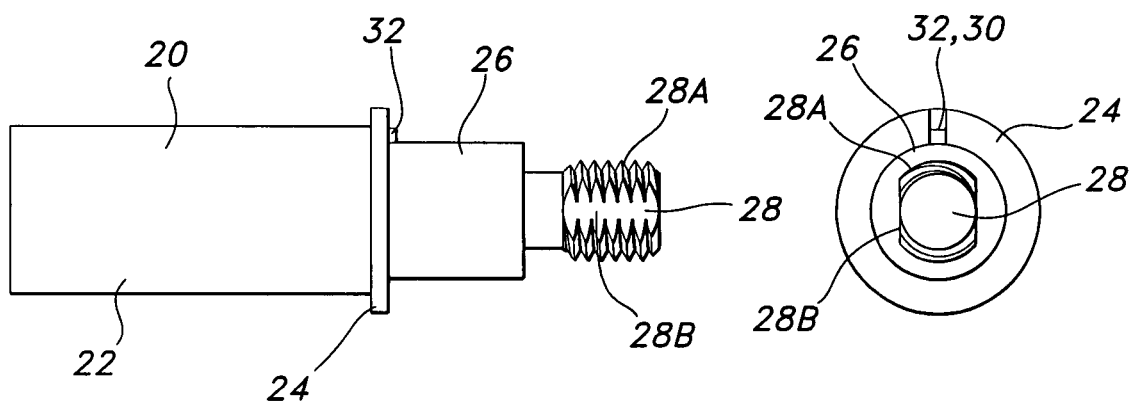
FIG. 2
FIG. 4
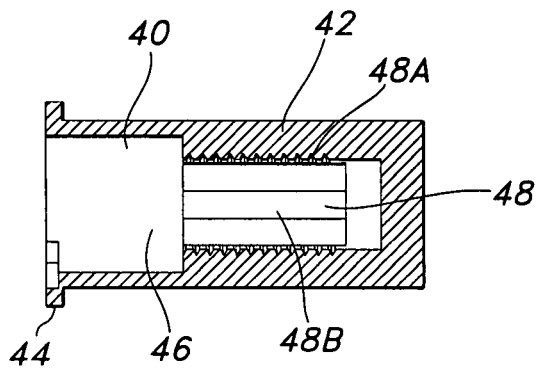
FIG. 3
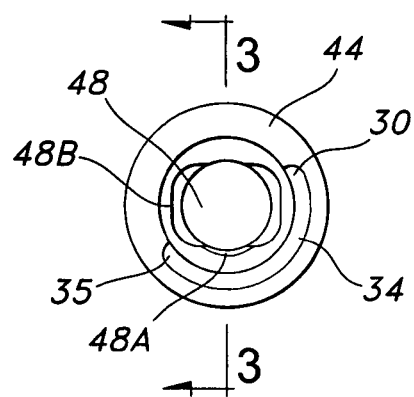
FIG. 5

PRECISION ALIGNING FASTENER

BACKGROUND INFORMATION

1. Field of the Invention

The invention relates to the field of bolt fasteners. More particularly, the invention relates to a bolt means that aligns two parts.

2. Description of the Prior Art

There are numerous types of objects that are long and slender, so long that they are difficult to ship, transport, or stow. For this reason, such objects are often broken down into two pieces. The difficulty lies in providing a connector means that allows one to easily and releasably join the two parts, so that they function together properly, and that does not significantly change the aesthetic look and feel of the object. A hunter's longbow is used to illustrate the difficulties of severing into two parts an object that is essentially a single component. The hunter's longbow is a very long, slender device that is a precision instrument with high aesthetic appeal. It is carefully crafted of beautiful materials to be aesthetically pleasing, as well as to have excellent balance and to fit the hand of the hunter. The bow is very slender, yet is very strong, as it must be able to withstand high forces when strung and pulled. Its length makes it difficult to transport and to ship, to carry on a backbacking trip, and to stow.

Efforts to solve the difficulties of transporting and stowing the longbow have resulted in the "takedown" bow, a bow that is severed at the riser and fitted with a releasable connector. The known connectors used for joining the two parts are either aesthetically unappealing, as they interfere with the beautiful lines and appearance of the bow, or do not provide the precision needed to quickly, reliably, and precisely align the two parts.

What is needed, therefore, is a means for assembling and precisely aligning two parts of an object. What is further needed is such a means that enables quick and relliable assembly. What is yet further needed is such a means that does not detract from the aesthetic beauty or appeal of the object.

BRIEF SUMMARY OF THE INVENTION

The invention is a precision aligning fastener for assembling and precisely aligning two parts. The fastener comprises two mating fastener bodies: a male body that is a threaded shaft and a female body that is a threaded bore, closed at one end and with a mounting flange at the open end. The inside of the bore is partially threaded with an "interrupted-thread pattern", that is, with threads cut at two locations in the bore for a total of ½ of the circumference of the mating male fastener, each section being 180 degrees apart and having threads that extend across ¼ of the circumference of the threaded shaft. The threaded shaft is a threaded bolt fastener with a mounting flange. Here, too, the threads are cut in an interrupted-thread pattern in two sections on the shaft, each section being ¼ the circumference of the shaft, and the two sections being 180 degrees apart on the shaft. The contour of the sections between the threaded sections on both the threaded shaft and the threaded bore is flattened, rather than round. This interrupted-thread pattern allows the threaded shaft to be completely inserted into threaded bore without interference, until the mounting flanges of each fastener body touch each other. At this point, the threads of the shaft and the bore are aligned, although not yet engaged. The threads are engaged by twisting one approximately ¼ rotation relative to the other part.

A stop may be provided on the precision aligning fastener to prevent overtightening of the fastener and to ensure proper alignment of the two parts of the object to be mated. A stop pin is provided on the flange of one fastener body and a stop track on the flange of the other fastener body. The pin travels along the track when the precision aligning fastener is twisted, until the pin hits the end of the track and prevents further counter-rotation of the two parts.

The precision aligning fastener may be assembled such that it is not visible when the two parts of an object are joined. The precision aligning fastener according to the invention is very suitable for quickly and releasably coupling long slender articles of manufacture that need to maintain exact alignment and structural integrity when together, but are desirably disassembled when not in use. Examples of such articles are a hunter's longbow, billiard cues, kayak paddles, furniture and other articles. Each fastener body of the precision aligning fastener is embedded within the article to be releasably joined. The example of the hunter's longbow will be used hereinafter for purposes of illustration only. It is understood that the use of the precision aligning fastener according to the invention is not in any way limited to use with a longbow.

The longbow is severed somewhere near the center of the bow, ideally in the riser. Each half of the longbow is provided with a recess to receive the shank body of one of the parts of the precision aligning fastener. The body of each part is placed into the recess. In both cases, the face of the mounting flange that faces toward the shank is fitted flush against the cut surface of the severed article. The shank body is ideally glued into place, although other means for securely holding the shank body in place may be used, such as using a key. A filler material, made of micarta or other suitable material, is machined to fit around the flange and to correspond with the outer contour of the bow. The two halves of the longbow are assembled by inserting the threaded shaft into the threaded bore and twisting the two halves turn, until stopped. The joint between the two halves is smooth and perfectly aligned. The precision aligning fastener is invisible; only the filler material along the joining seam is visible.

BRIEF DESCRIPTION OF THE DRAWINGS

The present invention is described with reference to the accompanying drawings. In the drawings, like reference numbers indicate identical or functionally similar elements.

FIG. 1 illustrates the precision aligning fastener according to the invention with the male and female parts threaded together.

FIG. 2 shows the threaded shaft.

FIG. 3 is a cross-sectional view of the threaded bore.

FIG. 4 is a frontal plane view of the threaded shaft, showing the ¼-sectional threads and the stop pin.

FIG. 5 is a frontal plane view into the threaded bore, showing the track for the stop pin.

DETAILED DESCRIPTION OF THE INVENTION

Figure 6:
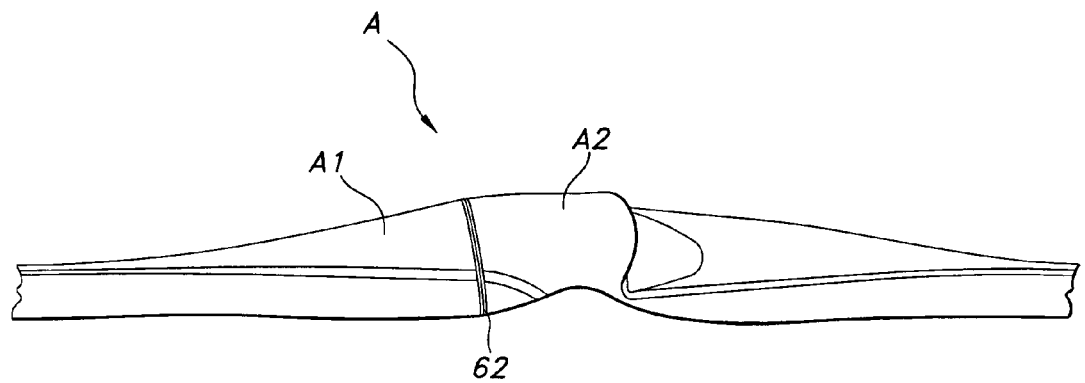
FIG. 6 illustrates two halves of an article joined by means of the precision aligning fastener according to the invention.

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-5 illustrate a precision aligning fastener 100 comprising a first body 20 and a second body 40. FIG. 1 shows the precision aligning fastener 100 fastened together, and FIGS. 2-5 show in detail features of the first and second bodies 20 and 40. The first body 20 comprises a first shank 22, a first mounting flange 24, and a shaft 26. The second body 40 comprises a second shank 42, a second mounting flange 44, and a bore 46. A portion of the shaft 26 is a threaded shaft 28, with an interrupted-thread pattern. Threads 28A are provided in two sections on the threaded shaft 28, with the two sections separated by an unthreaded portion 28B. The bore 46 has a section that is a threaded bore 48 and similarly, threads 48A in an interrupted-thread pattern are provided on two sections of the threaded bore 48, with the two sections separated by an unthreaded section 48B. The profile of the threaded shaft 28 is best seen in FIG. 4 and the threaded bore in FIG. 5. This interrupted-thread pattern allows the shaft 26 to be inserted completely into the bore 46, until the two mounting flanges 24 and 44 are touching. In this position, the threads 28A and 48A are aligned with each other, although not yet engaged. Twisting the two fastener bodies 20 and 40 a ¼ turn engages the threads and fastens the bodies together.

Optionally, a stop means 30 may be provided, to ensure proper alignment and prevent one from overtwising the precision aligning fastener 100. A stop pin 32 is provided at the base of the shaft 26 next to the first mounting flange 24 and a stop track 34 provided in the second mounting flange 44. The shaft 26 is inserted into the bore 46 and turned until the two flanges 24, 44 touch, with the stop pin 32 in the track 34. Then the two fastener bodies 20 and 40 are twisted together until the stop pin 32 hits up against a stop 35 in the track 34.

Figure 7:
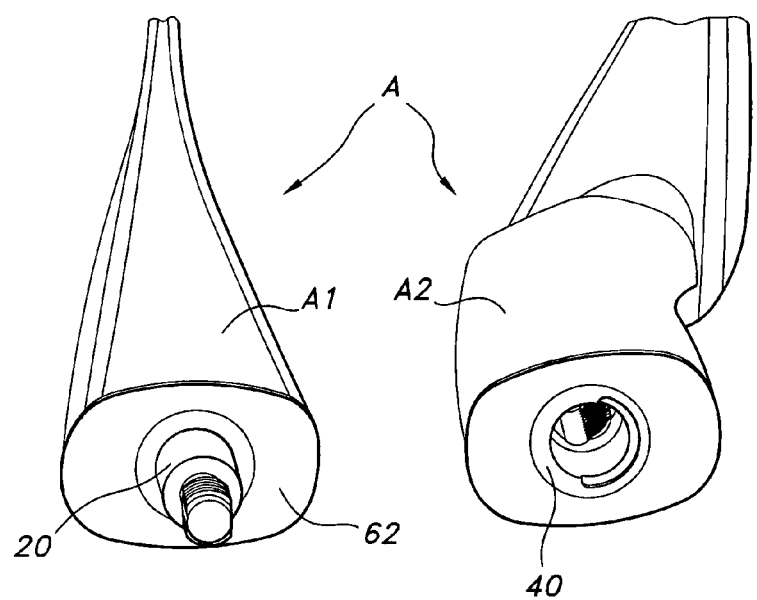
FIG. 7 illustrates the article of FIG. 6, disassembled and showing the threaded shaft and the bore assembled in the article.

FIGS. 6 and 7 illustrate the precision aligning fastener 100 according to the invention installed in an article A. For purposes of illustration only, the article shown is a hunter's longbow. As shown, the article A, normally a long slender single piece, has been severed in two article halves A1 and A2, and one of the two fastener bodies 20 and 40 has been mounted in each half, with the mounting flanges 22, 42, seated up against the respective severed face of the article halves A1 and A2. A filler 62 has been shaped to fit around the two flanges 24 and 44 and to correspond in shape to the outer contour of the article A. When the two severed halves A1 and A2 of the article A are assembled, as shown in FIG. 6, the precision aligning fastener 100 is invisible, and only the filler 62 can be seen. In the example shown, the material used for the filler 62 is the thickness of one flange, 24 or 44, and is glued or otherwise affixed to the face of each article half A1 and A2. The filler 62 is selected to best suit the material of the article A. A particularly suitable filler material for longbows, for example, is black micarta, a rugged and longlasting synthetic material that complements the wood of the bow.

The outer surfaces of the shanks 22 and 42 may be surface-treated to enhance adhesion to the article A. In the embodiment shown, the precision aligning fastener 100 is glued into the recesses in the article A, and the surfaces are knurled and provided with grooves, so as to provide more surface area to hold glue in place. Various materials may be used for the precision aligning fastener 100, depending on the strength and hardness requirements of the particular application. Suitable materials include metals and hard plastics, and combinations thereof.

It is understood that the embodiments described herein are merely illustrative of the present invention. Variations in the construction of the precision aligning fastener may be contemplated by one skilled in the art without limiting the intended scope of the invention herein disclosed and as defined by the following claims.

What is claimed is:

1. A precision aligning fastener comprising:
   a first body having a first shank with a first mounting flange and a shaft;
   a second body having a second shank with a second mounting flange and a bore;
   a stop means for aligning said first body with said second body and for preventing overtwisting, said stop means including a stop pin projecting from an end of said shaft adjacent said first mounting flange and a stop at each end of said stop track having a stop, said stop track being recessed in said second mounting flange and constructed to receive and restrict travel of said stop pin;
   wherein said shaft has a threaded end spaced from said first mounting flange with a first male interrupted-thread pattern and said bore has a threaded bore end spaced from said second mounting flange with a second female interrupted-thread pattern; wherein when said first body is aligned with said second body such that said first interrupted-thread pattern is disengaged from said second interrupted-thread pattern, said shaft is insertable into said bore until said first mounting flange and said second mounting flange abut each other, wherein said first body is aligned with said second body such that said stop pin is slidably received in said stop track when said first mounting flange and said second mounting flange abut each other; and wherein threads on said threaded end engage with threads in said threaded bore end when said first body and said second body are counter-rotated relative one another for a partial rotation that is limited by said stop pin abutting against said stop.

2. The precision aligning fastener of claim 1, wherein said first shank has an outer surface with a surface texture that increases a surface area of said first shank.

3. The precision aligning fastener of claim 1, wherein said second shank has an outer surface with a surface texture that increases a surface area of said second shank.

4. The precision aligning fastener of claim 1, wherein said partial rotation is limited to approximately ¼ rotation of said shaft relative to said bore.

5. A precision aligning fastener assembly comprising:
   said precision aligning fastener of claim 1 and a filler material, wherein said first mounting flange has a first thickness and said second mounting flange has a second thickness, and wherein said filler material has a filler thickness equivalent to said first thickness and said second thickness.

6. The precision aligning fastener assembly of claim 5, wherein said first mounting flange has a first outer diameter and said second mounting flange has a second outer diameter, and wherein said filler material is formed to fit around said first outer diameter and said second outer diameter.

7. A releasably joinable longbow comprising a longbow severed in two parts and a precision aligning fastener assembled in said longbow for releasably joining said two parts, said precision aligning fastener comprising:
 a first body having a first shank with a first mounting flange and a shaft;
 a second body having a second shank with a second mounting flange and a bore;
 a stop means for aligning said first body with said second body and for preventing overtwisting, said stop means including a stop pin projecting from an end of said shaft adjacent said first mounting flange and a stop at each end of said stop track having a stop, said stop track being recessed in said second mounting flange and constructed to receive and restrict travel of said stop pin;
 wherein said shaft has a threaded end spaced from said first mounting flange with a first male interrupted-thread pattern and said bore has a threaded bore end spaced from said second mounting flange with a second female interrupted-thread pattern; wherein when said first body is aligned with said second body such that said first interrupted-thread pattern is disengaged from said second interrupted-thread pattern, said shaft is insertable into said bore until said first mounting flange and said second mounting flange abut each other, wherein said first body is aligned with said second body such that said stop pin is slidably received in said stop track when said first mounting flange and said second mounting flange abut each other; and wherein threads on said threaded end engage with threads in said threaded bore end when said first body and said second body are counter-rotated relative one another for a partial rotation that is limited by said stop pin abutting against said stop.

8. A releasably joinable paddle comprising a paddle severed in two parts and a precision aligning fastener for releasably joining said two parts, said precision aligning fastener comprising:
 a first body having a first shank with a first mounting flange and a shaft;
 a second body having a second shank with a second mounting flange and a bore;
 a stop means for aligning said first body with said second body and for preventing overtwisting, said stop means including a stop pin projecting from an end of said shaft adjacent said first mounting flange and a stop at each end of said stop track having a stop, said stop track being recessed in said second mounting flange and constructed to receive and restrict travel of said stop pin;
 wherein said shaft has a threaded end spaced from said first mounting flange with a first male interrupted-thread pattern and said bore has a threaded bore end spaced from said second mounting flange with a second female interrupted-thread pattern; wherein when said first body is aligned with said second body such that said first interrupted-thread pattern is disengaged from said second interrupted-thread pattern, said shaft is insertable into said bore until said first mounting flange and said second mounting flange abut each other, wherein said first body is aligned with said second body such that said stop pin is slidably received in said stop track when said first mounting flange and said second mounting flange abut each other; and wherein threads on said threaded end engage with threads in said threaded bore end when said first body and said second body are counter-rotated relative one another for a partial rotation that is limited by said stop pin abutting against said stop.

\* \* \* \* \*